Patented May 14, 1929.

1,712,619

UNITED STATES PATENT OFFICE.

HARRY KARL IHRIG, OF BERKELEY, CALIFORNIA, ASSIGNOR TO ASSOCIATED OIL COMPANY, OF SAN FRANCISCO, CALIFORNIA, A CORPORATION OF CALIFORNIA.

PROCESS OF REFINING HYDROCARBON OILS.

No Drawing. Application filed June 15, 1927. Serial No. 199,117.

This invention relates to a method of refining hydrocarbon oils.

Crude petroleum obtained in different localities varies considerably in its constitution, especially with regard to elements which may be considered as contaminating to the products desired as well as those that corrode the equipment.

Two of the principal contaminating elements in California crude oil are sulphur, its compounds, and nitrogen compounds. It has been found that these compounds, either alone or in combination with other elements, seriously corrode the equipment, causing frequent renewals. In addition, the presence of these compounds makes it difficult to refine the distillate for the production of finished products sufficiently pure for commercial use without excessive cost.

It is therefore the object of this invention to effect a substantial reduction of these contaminating compounds in the distillates.

This may be accomplished by bringing the hydrocarbon vapors into intimate contact with a properly heated mixture of hydrated lime and crude iron oxide. Other metallic oxides may of course be substituted for the iron oxide.

As an example of actual operation, these objectionable compounds were substantially reduced by passing distillate from California crude oil through a mixture of 25% hydrated lime and 75% crude iron oxide, although other proportions may be used. These vapors were condensed and washed with 10° Bé. caustic soda. Samples of these distillates before this treatment was made failed to pass the corrosion test by the standard American Society Testing Materials method, while the distillate so treated showed a perfect corrosion test and continued charges put through the same mixture failed to change the result.

In this treatment, it is necessary to maintain the mixture of hydrated lime and iron oxide at a temperature sufficiently above the boiling point of any of the hydrocarbon vapors being treated so that there will be no condensation. It should also be noted that this is an inexpensive treatment due to the quality of material used as the iron oxide employed was of a very cheap grade and analyzed as follows:

|  | Per cent. |
|---|---|
| $Fe_2O_3$ | 23.9 |
| $CaO$ | 21.7 |
| $SO_3$ | 27.8 |
| $SiO_2$ | 1.4 |
| $CO_2$ | 1.6 |
| $H_2O$ | 21.2 |
| Undetermined | 2.4 |
|  | 100 |

No special form of apparatus is required to carry out this process, the essential and imperative features being that the apparatus be of such form as to admit of thoroughly heating of all vapor passing through it at a temperature sufficient to maintain it in a vapor condition and to expose the oil so heated to the action of a hydrated alkali, such as lime, and a metallic oxide, such as iron oxide.

What I claim is:

1. The method of treating normally liquid hydrocarbons in the gaseous phase which comprises bringing the vapors into intimate contact with a properly heated mixture of hydrated lime and iron oxide in approximately the proportion of one to three.

2. The method of treating normally liquid hydrocarbons which comprises vaporizing said hydrocarbons; and passing the vapors through a properly heated mixture of approximately 75% of crude iron oxide and 25% hydrated lime to substantially reduce the objectionable constituents contained in the hydrocarbons.

HARRY KARL IHRIG.